United States Patent
Thubert et al.

(10) Patent No.: US 12,526,258 B2
(45) Date of Patent: *Jan. 13, 2026

(54) OBFUSCATING SERVER-SIDE ADDRESSES

(71) Applicant: Cisco Technology, Inc., San Jose, CA (US)

(72) Inventors: Pascal Thubert, Roquefort les Pins (FR); Pradeep Kumar Kathail, Los Altos, CA (US); Eric Levy-Abegnoli, Valbonne (FR); David A. Maluf, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 222 days.

This patent is subject to a terminal disclaimer.

(21) Appl. No.: 18/205,464

(22) Filed: Jun. 2, 2023

(65) Prior Publication Data

US 2024/0406144 A1    Dec. 5, 2024

(51) Int. Cl.
*H04L 9/40* (2022.01)
*H04L 61/4511* (2022.01)

(52) U.S. Cl.
CPC ...... *H04L 63/0407* (2013.01); *H04L 61/4511* (2022.05); *H04L 63/0236* (2013.01); *H04L 63/0428* (2013.01); *H04L 2212/00* (2013.01)

(58) Field of Classification Search
CPC ............ H04L 63/0407; H04L 61/4511; H04L 63/0236; H04L 63/0428; H04L 2212/00; H04L 12/4633; H04L 61/2514
See application file for complete search history.

(56) References Cited

U.S. PATENT DOCUMENTS 6,591,306 B1 *   7/2003  Redlich .................. H04L 69/16
                                                          370/466
9,438,531 B2 *   9/2016  Freitas .................. H04L 47/70
(Continued)

FOREIGN PATENT DOCUMENTS

KR    20180130802    6/2019

OTHER PUBLICATIONS

Wu, Yongdong, et al. "Software puzzle: A countermeasure to resource-inflated denial-of-service attacks." IEEE Transactions on Information Forensics and security 10.1 (2014): 168-177.*

(Continued)

*Primary Examiner* — Jimmy H Tran
(74) *Attorney, Agent, or Firm* — Lee & Hayes, P.C.

(57)    ABSTRACT

Techniques for using Locator ID Separation Protocol (LISP), Mobile Internet Protocol (MIP), and/or other techniques in conjunction with Domain Name System (DNS) to obfuscate server-side addresses in data communications. Rather than having DNS provide a client device with an IP address of an endpoint device, such as a server, the DNS instead returns an endpoint identifiers (EID) that is mapped to the client device and at least one routing locator (RLOC) of the endpoint device. In this way, IP addresses of servers are obfuscated by a network mapping of EIDs and RLOCs. The client device may then communicate data packets to the server using the EIDs as the destination address, and a virtual network service that works in conjunction with DNS can encapsulate the data packet with the RLOC using LISP and forward the data packet onto the server.

20 Claims, 6 Drawing Sheets

(56) References Cited

U.S. PATENT DOCUMENTS

| | | | | |
|---|---|---|---|---|
| 9,781,000 B1* | 10/2017 | Kumar | H04L 67/01 |
| 9,929,951 B1* | 3/2018 | Dickinson | H04L 67/1031 |
| 10,015,132 B1* | 7/2018 | Qin | H04L 61/2567 |
| 10,027,546 B1* | 7/2018 | Qin | G06F 9/45558 |
| 11,038,716 B2* | 6/2021 | Allan | H04L 61/5084 |
| 11,683,286 B2* | 6/2023 | Thubert | H04L 63/0236 709/245 |
| 11,863,528 B1* | 1/2024 | Chung | H04L 69/22 |
| 2004/0249974 A1* | 12/2004 | Alkhatib | H04L 61/2503 709/245 |
| 2007/0008980 A1* | 1/2007 | Dommety | H04W 28/06 370/395.52 |
| 2007/0019545 A1* | 1/2007 | Alt | H04L 63/0428 370/230 |
| 2007/0083670 A1* | 4/2007 | Kelley | H04L 63/126 709/245 |
| 2010/0189099 A1* | 7/2010 | Bae | H04L 61/2514 370/352 |
| 2011/0238801 A1* | 9/2011 | Bahl | H04L 61/5076 709/221 |
| 2012/0173694 A1* | 7/2012 | Yan | H04L 12/4641 709/223 |
| 2012/0180122 A1* | 7/2012 | Yan | H04L 12/4633 726/15 |
| 2012/0250682 A1* | 10/2012 | Vincent | H04L 12/4633 370/392 |
| 2013/0103819 A1* | 4/2013 | Meyer | H04L 61/5007 709/223 |
| 2015/0188802 A1* | 7/2015 | Yoon | H04L 45/64 709/238 |
| 2015/0271135 A1* | 9/2015 | Tseng | H04L 61/2575 709/228 |
| 2016/0087940 A1* | 3/2016 | Miller | G06F 9/45558 726/15 |
| 2017/0026417 A1* | 1/2017 | Ermagan | H04L 63/0428 |
| 2017/0230330 A1* | 8/2017 | Figovsky | H04L 61/2528 |
| 2017/0316106 A1* | 11/2017 | Pillay-Esnault | H04L 61/103 |
| 2018/0343227 A1* | 11/2018 | Arango | H04L 61/5084 |
| 2018/0367459 A1* | 12/2018 | Chandrasekaran | H04L 45/02 |
| 2019/0007366 A1* | 1/2019 | Voegele | H04L 61/4511 |
| 2019/0081890 A1* | 3/2019 | Ravindran | H04L 45/741 |
| 2019/0199636 A1* | 6/2019 | Narayanan | H04L 47/125 |
| 2020/0044892 A1* | 2/2020 | Allan | H04W 8/08 |
| 2020/0045604 A1* | 2/2020 | Allan | H04W 36/22 |
| 2020/0213151 A1* | 7/2020 | Srivatsan | H04L 63/0281 |
| 2021/0021634 A1* | 1/2021 | Babakian | H04L 61/2567 |
| 2021/0119961 A1* | 4/2021 | Thunga | H04L 61/4511 |
| 2021/0168125 A1* | 6/2021 | Vemulpali | H04L 9/3236 |
| 2021/0185016 A1* | 6/2021 | Ronin | H04L 41/0894 |
| 2021/0194728 A1* | 6/2021 | Gundavelli | H04W 4/24 |
| 2021/0195406 A1* | 6/2021 | Gundavelli | H04W 80/04 |
| 2021/0352017 A1* | 11/2021 | Williams | H04L 12/4633 |
| 2021/0352047 A1* | 11/2021 | Singh | H04L 61/2592 |
| 2021/0377208 A1* | 12/2021 | Xiaopu | H04L 45/02 |
| 2021/0392111 A1* | 12/2021 | Sole | H04L 63/1416 |
| 2022/0006671 A1* | 1/2022 | Wondra | H04L 45/64 |
| 2022/0007251 A1* | 1/2022 | Allan | H04W 76/30 |
| 2022/0131898 A1* | 4/2022 | Hooda | H04L 63/1425 |
| 2022/0159083 A1* | 5/2022 | Jain | H04L 67/10 |
| 2022/0239696 A1* | 7/2022 | Konda | H04L 61/4511 |
| 2022/0326980 A1* | 10/2022 | Koponen | H04L 41/0894 |
| 2022/0360528 A1* | 11/2022 | Jain | H04L 45/74 |
| 2023/0006968 A1* | 1/2023 | Catz | H04L 69/16 |
| 2023/0133809 A1* | 5/2023 | Ayyadevara | H04L 63/0884 709/225 |
| 2023/0275868 A1* | 8/2023 | Thubert | H04L 63/1458 709/245 |
| 2023/0344921 A1* | 10/2023 | Duraisamy | H04L 63/0272 |
| 2023/0421478 A1* | 12/2023 | Chhabra | H04L 63/0272 |
| 2023/0421538 A1* | 12/2023 | Ponaka | H04L 63/0236 |
| 2024/0205048 A1* | 6/2024 | Nandy | H04L 45/66 |
| 2024/0205194 A1* | 6/2024 | Low | H04L 63/1491 |
| 2024/0291744 A1* | 8/2024 | Chhabra | H04L 69/16 |

OTHER PUBLICATIONS

Eid, Mohamad Samir A., and Hitoshi Aida. "Securely hiding the real servers from DDoS floods." 2010 10th IEEE/IPSJ International Symposium on Applications and the Internet. IEEE, 2010.*

He, Gaofeng, et al. "Preventing IoT DDOS attacks using blockchain and IP address obfuscation." 2021 13th International Conference on Wireless Communications and Signal Processing (WCSP). IEEE, 2021.*

* cited by examiner

OBFUSCATING SERVER-SIDE ADDRESSES

TECHNICAL FIELD

The present disclosure relates generally to obfuscating addresses of endpoints, such as servers, in traffic communicated from source devices.

BACKGROUND

Networks such as the Internet use the Domain Name System (DNS) to essentially provide mappings between human-readable domain names (e.g., website addresses, service addresses, etc.) that client devices are seeking and the actual Internet Protocol (IP) addresses for devices hosting the websites or providing the services. Generally, client devices send DNS queries to resolve domain names to a DNS server, and the DNS server then resolves the domain names to the corresponding IP addresses and sends DNS responses to the client devices that include the IP addresses. The client devices are then able to communicate data packets with the desired website or service using the IP address of the device(s) supporting the website or service.

Client devices often send information in data packets that is sensitive or private, and when the data packets are sent over public networks, the information in those packets can be viewed by potentially entities. Accordingly, various types of encryption protocols (e.g., Hypertext Transfer Protocol Secure (HTTPS)) are used to communicate data packets over networks such that the payload of the data packets is encrypted to prevent entities from discerning sensitive information. However, the headers of the data packets are often unencrypted because information in the headers are often needed to make networking decisions. For instance, destination IP addresses are used to make routing decisions such that the data packets reach the correct destinations, source IP addresses can be used to make firewall decisions to drop or allow packets, and so forth. However, client devices may further desire that information in the headers is obfuscated as well from potentially malicious entities, such as the source address.

In light of this, there have been large efforts to develop techniques to anonymize the client devices' IP addresses (and/or other information such as Media Access Control (MAC) addresses) to protect the privacy of users. However, the destination addresses in the packets are generally still visible because they need to be used for networking decisions, such as routing decisions. Various issues arise due to the visibility of the IP addresses shown in the destination address field. For instance, once the address of the destination device (e.g., server, endpoint, etc.) is known to a malicious entity, the address can be used for direct attacks on the destination device (e.g., distributed denial-of-service (DDOS) attacks). It can be very difficult to discriminate legitimate traffic to the servers from attacks. Additionally, malicious entities may be able to observe where the client devices are sending traffic, or which sites they are consulting. If the malicious entities are close to the client device, the malicious entities may be able to correlate the client device and server, thereby eliminating privacy of the client device. Thus, destination devices, such as servers or other endpoints, are vulnerable to various attacks by malicious entities.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1A:
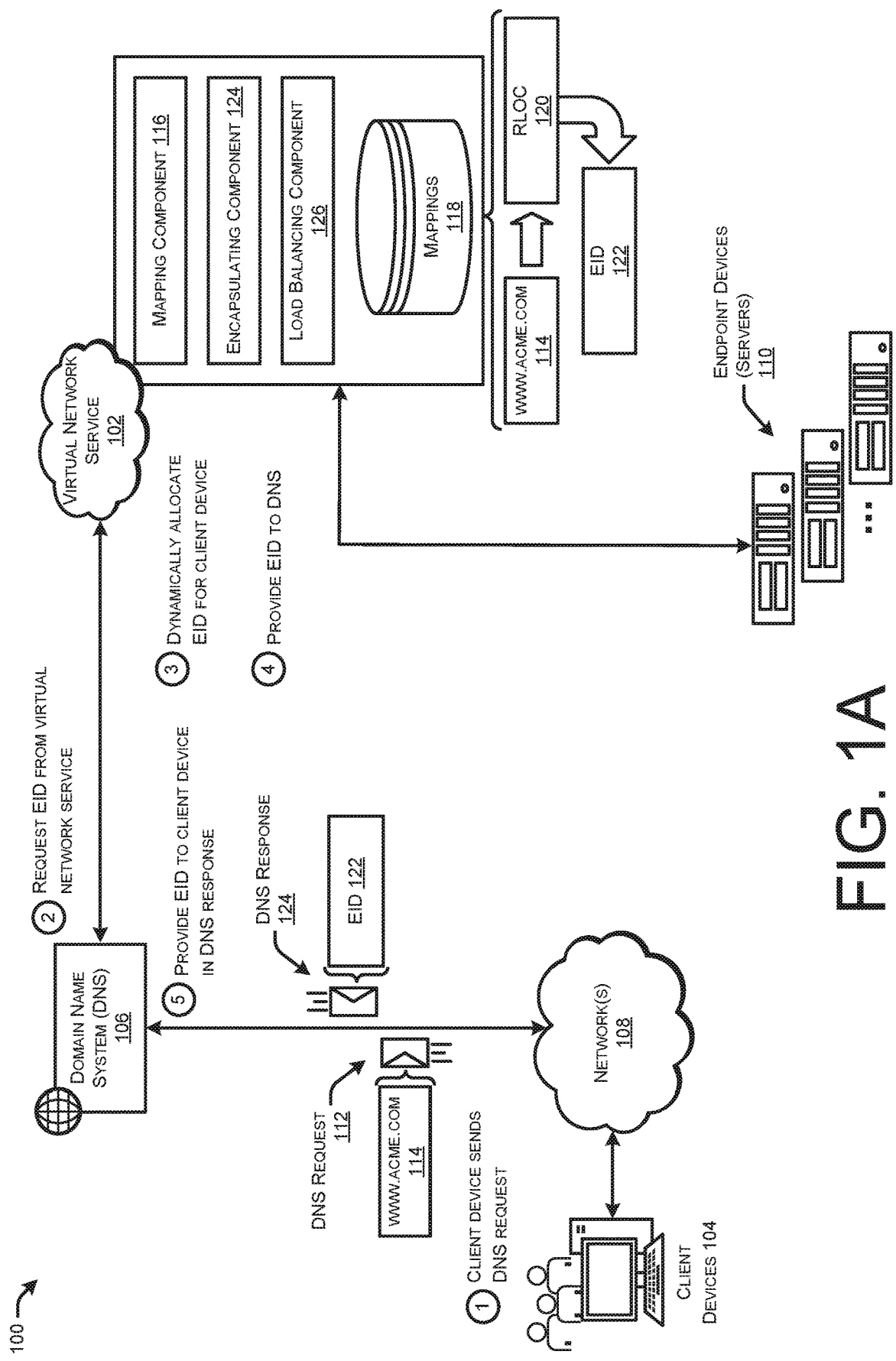
FIG. 1A illustrates a system-architecture diagram of a virtual network service that maps endpoint identifiers (EIDs) to routing locators (RLOCs) of endpoints devices such that a DNS server can provide client devices with respective EIDs that are usable to reach the endpoint devices.

This disclosure describes techniques for using Locator ID Separation Protocol (LISP), and/or other techniques in conjunction with DNS to obfuscate server-side addresses in data communications. LISP is a network architecture and protocol that implements the use of two namespaces instead of a single IP address. A first namespace includes endpoint identifiers (EIDs) that are assigned to end hosts and a second namespace includes routing locators (RLOCs) that are assigned to devices (e.g., routers) that make up the global routing system.

A first method to perform techniques described herein includes mapping an EID of an endpoint (e.g., server) to one or more RLOCs that are assigned to the endpoint, such as allocating the EID of the server to a block of RLOCS of the server. The first method may further include receiving a Domain Name Service (DNS) request to resolve a domain name on behalf of a client device, and converting the domain name into the EID of the endpoint. The first method may further include providing the EID for use by the client device to contact the endpoint.

In some instances, the first method may further include receiving a packet having a destination address that is the EID, determining that a source address of the packet is a source IP address of the client device that sent the packet, performing an encapsulation of the packet with an RLOC that corresponds to the EID, and sending the packet to a next hop associated with the RLOC of the endpoint. The method of claim 1 may be performed by a system and/or device that includes a DNS server or is associated with a DNS server.

In some instances, the techniques described herein include a second method. The second method may include mapping at least one RLOC of an endpoint from multiple endpoints to an EID from multiple EIDs. The second method may further include determining that a client device requested the IP address of the endpoint, selecting the EID from the multiple EIDs to provide to the client device, and storing a first association between a client identifier (ID) of the client device and the EID. Further, the second method may include providing the EID for use by the client device to contact the endpoint, and receiving a first packet having a destination address that is the EID. The second method may include, in response to determining that the first packet was sent from the client device, sending the first packet to the endpoint, or in response to determining that the first packet was sent from a different device, dropping the first packet.

Additionally, the techniques described herein may be performed by a system and/or device having non-transitory computer-readable media storing computer-executable instructions that, when executed by one or more processors, performs the method described above.

Example Embodiments

Generally, the address of a website that a client device visits is indicative of the location of the server and/or cloud tenant that includes the server, and can be used to approximate the website that the client device is visiting. With Transport Layer Security (TLS), HTTPS, and the like, that is some of the only information available to an observer on path that may do operations like slowing or blocking some destinations, or use the information against the client in whichever fashion. While techniques have been developed to protect the source address of the client device, there are no techniques for protecting the address of the server, which is only partially hidden from public view by complex cloud architectures and load balancers.

When a load balancer or a Network Address Translator (NAT) are placed before the server, the observer may still be able to get very close to the server and the observer can still determine where the client device is going. The techniques described herein obfuscate the destination IP so additional aspects of the packet become private.

This disclosure describes techniques for using LISP and/or other techniques in conjunction with DNS to anonymize server-side addresses in data communications. Rather than having DNS provide a client device with an IP address of an endpoint device, such as a server, the DNS instead returns an EID that is mapped to the client device and the endpoint device that has at least one RLOC that corresponds to the EID. In this way, IP addresses of servers are obfuscated by a virtual network of EIDs and RLOCs. The client device may then communicate data packets to the server using the EID as the destination address, and a virtual network service that works in conjunction with DNS can encapsulate a received data packet having the EID with the actual RLOC of the server using the virtual network and forward the data packet onto the server.

A client device may send a DNS request to a DNS server for the DNS server to translate or resolve a domain name (e.g., website name, service name, etc.) to an IP address that is usable to contact the domain name. Traditionally, the DNS server would simply resolve the domain into the IP address (and/or other contact information) registered for the server and return the IP address to the client device. However, according to the techniques described herein, a virtual network service may work in conjunction (and/or be included in) the DNS service to provide EIDs on a client device-by-client device basis. That is, the virtual network service may associate an EID for each RLOC associated with a particular server (e.g., endpoint) and/or an IP address of the server. As client devices request the DNS for the IP address of a particular server, the virtual network service and/or DNS may provide an EID mapped to the RLOC of the server to each client device, and store a mapping between each EID and the client device that received the EID. Thus, client devices may request that DNS provide them with an IP address for a particular server, and each client device may be provided with an EID that is mapped to the server having the RLOC associated with the IP address by the virtual network service.

After receiving an EID, the client device may then attempt to send data packets to the particular server by placing the EID in the destination address field of the packets. However, the EID may result in the data packets being steered to the virtual network service. The virtual network service may then determine that the EID maps to the RLOC of the particular server, and may further determine that the client device was in fact provided the EID, and the virtual network service may encapsulate the data packets with the RLOC. That is, the virtual network service may encapsulate the data packet with an IP header that has the RLOC in the destination field (e.g., destination address) so that the data packet is routed to the actual location of the server. In this way, the destination address of servers may be represented by EID that are not actually the IP addresses of the servers, but can be encapsulated using LISP techniques into the correct RLOC and/or IP addresses for reaching the servers.

In addition to obfuscating the IP addresses of servers and endpoints to prevent attacks on the servers, the techniques may further allow the virtual network service to track source devices that may be attacking the servers. For instance, the virtual network service may note the source addresses that are using EIDs to attempt to reach the servers despite those source devices not being provided the EIDs by the virtual network service.

In some instances, the virtual network service may additionally ensure that traffic returning to the client device and from the servers is also protected. That is, the servers may be configured to utilize their IP addresses as source addresses in data packets. In such examples, the virtual network service may also convert the source IP address of the client devices into system VIP addresses that are virtual addresses that map back to the virtual network service. Generally, the virtual network service may map a respective system VIP address to each client device such that the return traffic from the servers can be redirected back to the appropriate client device. So, when servers receive the traffic having source addresses that are system VIP addresses for the virtual network service, the servers may respond with data packets that include the respective system VIP address as a destination address. Once the virtual network service receives the packet, the virtual network service decapsulates the packet such that the destination address indicating the system VIP address is removed and the IP address of the appropriate client device remains. In this way, the virtual network service may also obfuscate client device IP addresses while ensuring that return traffic from the servers reach the correct client device.

In some instances, the virtual network service may additionally provide load balancing services to servers that are intended to received data packets. For example, the virtual network service may associate a number of servers with a singular endpoint (e.g., multiple servers supporting a website) and each server and/or group of servers may be associated with an RLOC, while the endpoint itself is associated with a single EID. That is, in some cases, the virtual network service may store a single EID for an endpoint that has multiple RLOCs associated with the respective servers that support the endpoint. In some examples, when the virtual network service receives a data packet from a client device, the virtual network service may determine which server to send the data packet to based on load balancing the endpoint system and to optimize performance of the endpoint system. Once the particular server is identified based on improving performance of the endpoint system, the virtual network service may determine the RLOC associated with that server and encapsulate the data packet using the RLOC such that the data packet will be sent to the identified server.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1A illustrates a system-architecture diagram 100 of a virtual network service 102 that maps EIDs to RLOCs of endpoints devices such that a DNS server can provide client devices with respective EIDs that are usable to reach the endpoint devices.

As illustrated, client devices 104 are able to communicate with DNS 106, which is generally one or more DNS servers that perform DNS operations. The client devices 104 may be any type of computing device that uses DNS to communicate with one or more endpoint devices 110. For instance, the client devices 104 may be personal user devices (e.g., desktop computers, laptop computers, phones, tablets, wearable devices, entertainment devices such as televisions, etc.), network devices (e.g., servers, routers, switches, access points, etc.), and/or any other type of computing devices.

The client devices 104 may communicate with the DNS 106, the virtual network service 102, the endpoint devices 110, and/or any other computing devices over one or more networks 108, such as the Internet. The network(s) 108 may each may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof.

At "1," a client device 104 may generate and send a DNS request 112 to the DNS 106. The DNS request 112 may include a request for the DNS 106 to translate a domain name (e.g., "www.acme.com") into an IP address that can be used for sending traffic to the desired website, service, etc., associated with the domain name.

The DNS 106 may receive the DNS request 112 and, at "2," request an EID from the virtual network service 102. The DNS 106 may also provide the virtual network service 102 with an indication of the domain name that the client device 104 would like encapsulated using the RLOC. In other examples, the DNS 106 may provide the actual IP address to the virtual network service 102 for the desired domain name.

Although illustrated as separate entities that communicate with each other, in some instances the DNS 106 and virtual network service 102 may be the same entity. That is, the DNS 106 may include the virtual network service 102, the virtual network service 102 may include the DNS 106, and so forth. The virtual network service 102 may be a cloud-based security service, a LISP service, and/or any type of platform or system.

The virtual network service 102 may receive the request for the EID for the domain name/IP address and at "3" dynamically allocate an EID for the client device. Generally, the virtual network service 102 may map or otherwise assign EIDs to RLOCS and/or IP addresses of endpoints 110. In some examples, the virtual network service 102 may allocate a prefix (e.g., /64 for IPv6, /24 for IPv4) in a geography to protect the addresses of the servers 110 that it serves in that geography. In the case of IPv4, the stat is indexed by the pair client address+EID, so the same EID can be used for multiple clients to denote different real servers 110 in some instances. As illustrated, the virtual network service 102 may map the domain name 114 to the service RLOC 120 for the service or website, and may then map that RLOC 120 to the EID 122.

At "4," the virtual network service 102 may provide the EID to the DNS and/or directly to the client device 104. The EID 122 may be provided to the client device 104 in a DNS response 124 such that the client device 104 determines that the EID is usable to contact the desired endpoint device 110. Although illustrated as servers, the endpoint devices 110 can generally be any device that a client device 104 would like to contact, including user devices (e.g., laptops, phones, wearable devices, etc.), network devices (e.g., routers, switches, hubs, etc.), and/or any other type of devices that can be contacted over networks 108.

Figure 1B:
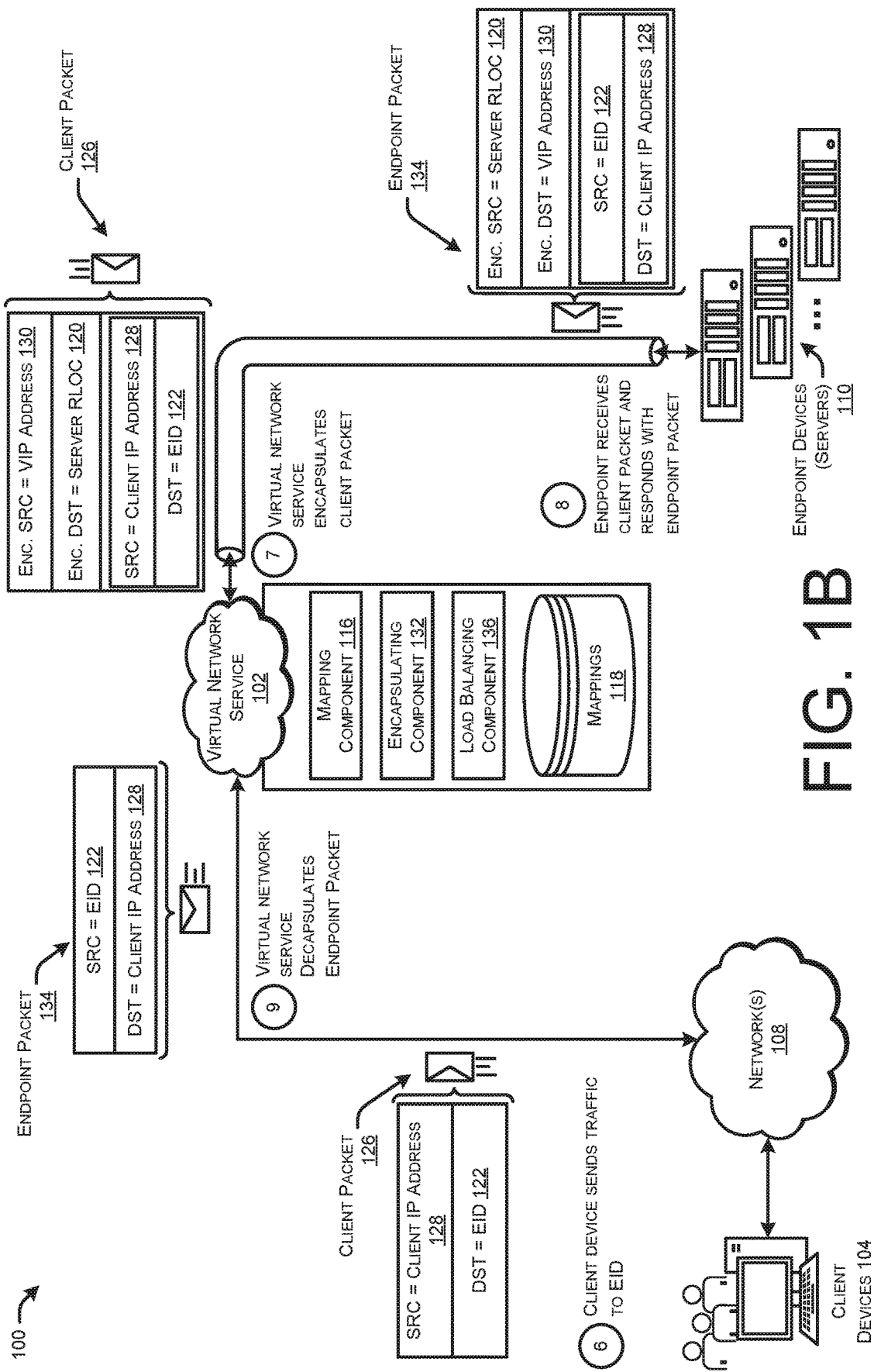
FIG. 1B illustrates a system-architecture diagram of a virtual network service that utilizes Locator ID Separation Protocol (LISP) to obfuscate a destination address of packets sent from a client device.

FIG. 1B illustrates a system-architecture diagram 100 of a virtual network service 102 that utilizes LISP to encapsulate data packets sent from a client device 104 using and RLOC of the endpoint device 110.

At "6," the client device 104 may send traffic including a client packet 126 to the EID 122 that was provided in the DNS response 124. The client packet 126 may include the EID 122 corresponding to the desired endpoint device 110 as the destination address, and may further include the client IP address 128 of the client device 104 as the source address. Generally, the EID 122 may cause the client packet 126 to be communicated to the virtual network service 102 by devices in the network(s) 108.

At "7," the virtual network service 102 may encapsulate the client packet 126 using LISP techniques. For instance, a mapping component 116 may utilize mappings 118 to determine which EIDs corresponds to which RLOCS of the various endpoint devices. Once the appropriate RLOC is identified, an encapsulating component 132 may encapsulate the client packet 126 with an IP header that has the server RLOC 120 in the destination field (e.g., destination address) so that the data packet is routed to the actual location of the server. In some cases, the IP header used to encapsulate the client packet 126 may be referred to as an outer header and/or and outer IP header.

In some examples, optionally, the virtual network service 102 may additionally encapsulate the source address of the client packet 126 such that return traffic from the endpoint devices 110 is sent to the virtual network service 102. For instance, encapsulating component 132 may utilize VIP addresses corresponding to the virtual network service 102 as source addresses in the outer header such that return traffic is sent to the virtual network service 102. The encapsulating component 132 may encapsulate the client packet 126 such that the source address field of the outer header of the packet 126 into indicates a particular VIP address 130, and store a mapping 118 between the client device 104 and the VIP address 130. In some instances, client devices 104 may have respective VIP addresses 130 such that the virtual network service 102 can cause return traffic from the endpoint devices 110 flow back through the virtual network service 102.

In some examples, optionally, the virtual network service 102 may additionally provide load balancing services, via the load balancing component 136, to endpoint devices 110 intended to received data packets. For example, the virtual network service 102 may associate a number of servers with a singular endpoint (e.g., multiple servers supporting a website) and each server and/or group of servers may be associated with an RLOC, while the endpoint itself is associated with a single EID. That is, in some cases, the virtual network service 102 may store a single EID for an endpoint that has multiple RLOCs associated with the respective servers that support the endpoint (e.g., the multiple servers that support a website). In some examples, when the virtual network service 102 receives the client packet 126 from the client device 104, the load balancing component 136 may determine which server to send the client packet 126 to based on load balancing the endpoint devices 110 to optimize performance of the endpoint devices 110. Once the particular server is identified, the virtual network service 102 and/or the load balancing component 136 may determine the RLOC associated with that server and encapsulate the client packet 126 using the RLOC such that the client packet 126 will be sent to the identified server.

The client packet 126 is then communicated to the endpoint device 110 corresponding to the server RLOC 120 (and the corresponding EID 122) indicated in the client packet 126. The endpoint device 110 may, in some examples, determine to respond to the client device 104. The endpoint device 110 may use the source address of the outer header of the client packet 126 (e.g., the VIP address 130) as the destination address in the endpoint packet 134, and the server RLOC 120 as the source address. Thus, the endpoint device 110 may send one or more endpoint packets 134 with, in the outer header, the VIP address 130 as the destination address such that the endpoint packet 134 is sent to the virtual network service 102 at "8." In this way, the payload of the endpoint packet 134 having a source address indicating the EID 122 and a destination address indicating the client IP address 128 may be obfuscated as well.

The mapping component 116 may, at "9," decapsulate the outer header from the endpoint packet 134 thereby removing the source address indicating the server RLOC 120 and the destination address indicating the VIP 130. The mapping component 116 and/or the encapsulating component 132 may use the mappings 118 to decapsulate the outer header from the endpoint packet such that the endpoint packet indicates that the destination address field includes the client IP address 128 of the client device 104 such that the endpoint packet 134 is sent to the client device 104. Further, the mapping component 116 and/or the encapsulating component 132 may use the mappings 118 to decapsulate the outer header of the endpoint packet 134 such that the source address field of the endpoint packet 134 includes the EID 122. In this way, any return traffic to the client device 104 that has the EID 122 as the source address of the endpoint packet 134 may be sent to the client device 104.

In the example of FIG. 11B, in some cases, the techniques may be performed according to home agent techniques of Mobile IPv6 defined by Request for Comments (RFC) 6275. The DNS 106 may use a new interface with a HA function where the interface enables the DNS server 106 to query the HA function for an EID upon a DNS request. The novel query contains the client address and the server address that it would have returned by the DNS server without the invention, for its customers, the HA function returns an address from the /64 in the virtual interface. The end result is that the set of clients of the virtual network service 102 appear to be located in the same flat subnet, with the effect to hide the topology and the server addresses altogether.

Using that interface, when a new DNS request 112 is made (either by new client 104 or for a different server from a known client 104), one EID (serving as home address in mobility management) in the /64 is allocated dynamically by the HA, returned to the DNS server 106 and that is the address returned to the client in the DNS response 124. The server address used but a given client will remain constant as long as the client uses the server without doing a new DNS lookup from a new source address. When the same client does the same request again, it is usually preferable to return the same address as the first time to keep the sessions going. To that effect, the techniques described herein include load-balancing the DNS 106 to HA interface based on the client address, or a hash of the client address and the DNS name. This way the same request is served by the same HA server which can return the EID from an existing state if one is found.

A home agent function (from MIPv6 RFC 6275 or similar mobility protocol) is associated to the virtual network service 102. That home agent function tunnels the packet for the EID assigned to the server to the real address (e.g., the RLOC) of the server (used as Care-Of Address in the packet). MIPv6 uses a normal tunnel but alternates like SRH insertion and PA T are possible.

In the case of MIPv6, the server 110 can use some Home Address option to talk to the Home agent with respect to the particular client device 104. In-band (in the tunnel as an implicit function) or out of band, the home agent instructs the server 110 to support the home address, e.g., add it to a loop back or just store it in the socket information. When it responds, the server 110 responds with the server RLOC 120 as being the indicated source. If ingress filtering—BCP 38, RFC 2827—is enforced, the server needs to tunnel back to the home agent, using its real address as source. This enables the server 110 to do its real process but based on the virtual IP, so any application state and crypto that relies on that address continues to work. The home agent is located in the virtual network service 102. Packets to and from the home agent and the server are tunneled to using the Home Address option from the server to the home agent.

Figure 2:
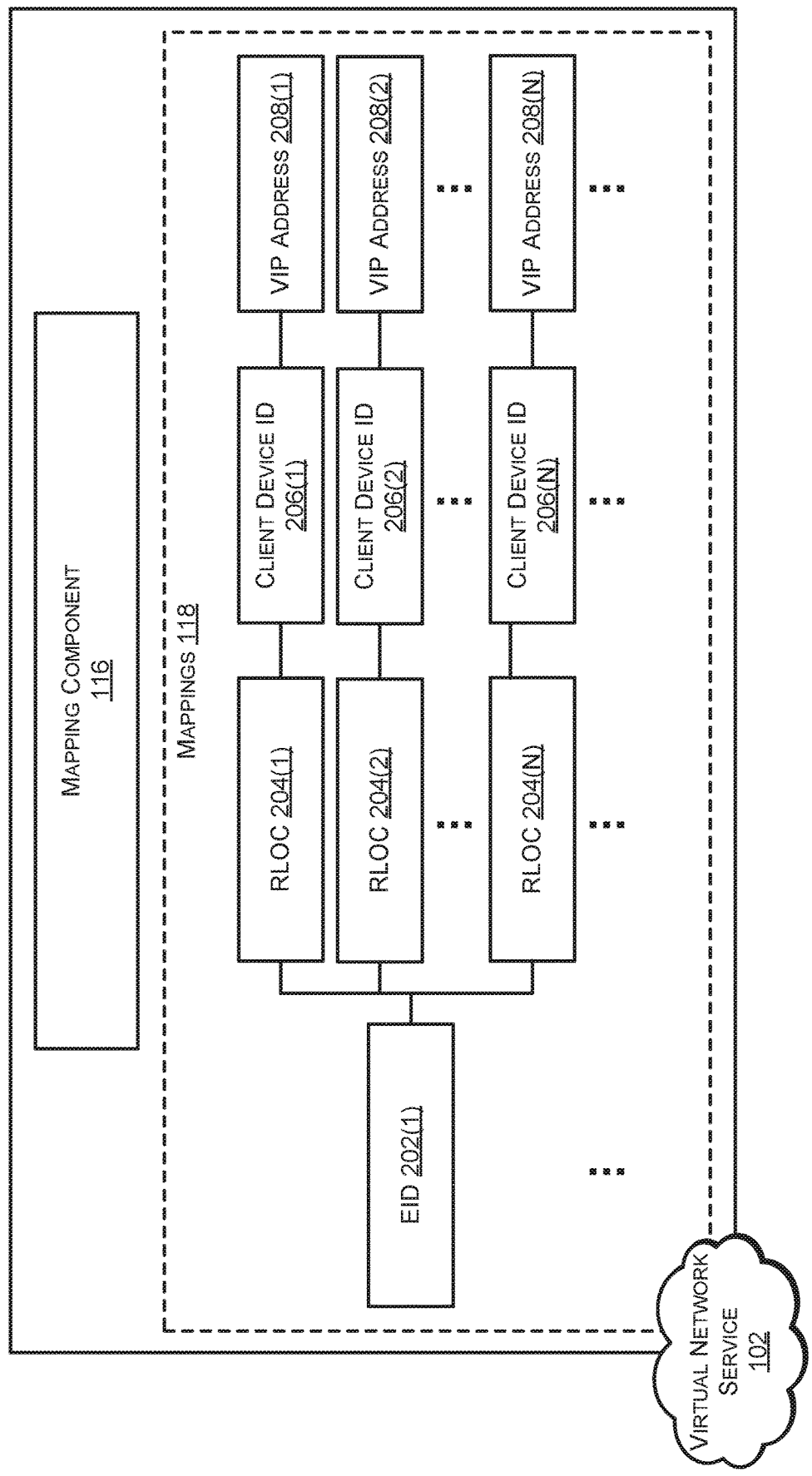
FIG. 2 illustrates example mappings between routing locators (RLOCs) of a server, endpoint identifiers (EIDs) mapped to the RLOCs, and client device identifiers (IDs) mapped to respective VIP addresses.

FIG. 2 illustrates example mappings 118 between an RLOC of a server, EIDs mapped to the RLOCs, client device identifiers (IDs) mapped to respective EIDs, and VIP addresses used for respective client devices. As illustrated, the mapping component 116 may store mappings, which may generally be any type of association in memory. Although not illustrated, at least some of the mapping 118 information may be stored at the DNS 106, and/or the DNS 106 may be included in the virtual network service 102.

The mapping component 116 may initially store indications of EIDs 202(1)-202(N) (not illustrated) and RLOCs 204(1)-204(N). Generally, each endpoint device 110, or server, has at least one actual EID 202 and at least one actual RLOC 204. Each EID 202 may then be mapped to their respective RLOCs 204(1)-204(N) where "N" is based on the number of client devices 104 that have requested the EID for the particular server 110.

Each time the mapping component 116 allocates and provides a client device 104 with a EID 202, the mapping component 116 may store an association or mapping 118 between the EID 202, the RLOC 204, and a client device ID

206 for that client device 104 (e.g., client IP address in some examples). Thus, each EID 202 is associated with a respective client device ID 206 and RLOC 204. In some instances, the mapping component 116 may further map each client device ID 206 with a respective VIP address 208 that is used for ensuring that return traffic from the servers 110 is sent back to the virtual network service 102. By having a VIP address 208 mapped to each client device ID 206, when the virtual network service 102 receives traffic back from the endpoint devices 110 that has the destination address as a particular VIP address 208, the mapping component 116 may use the mappings 116 to decapsulate the outer header having the VIP address 208 back to a client IP address of the client device 104 and send the packet to the correct client device 104 using the current client IP address.

It should be understood that the mappings 118 are merely illustrative, and other types of mappings 118 or data structures can be used for the LISP techniques described herein.

Figure 3A:
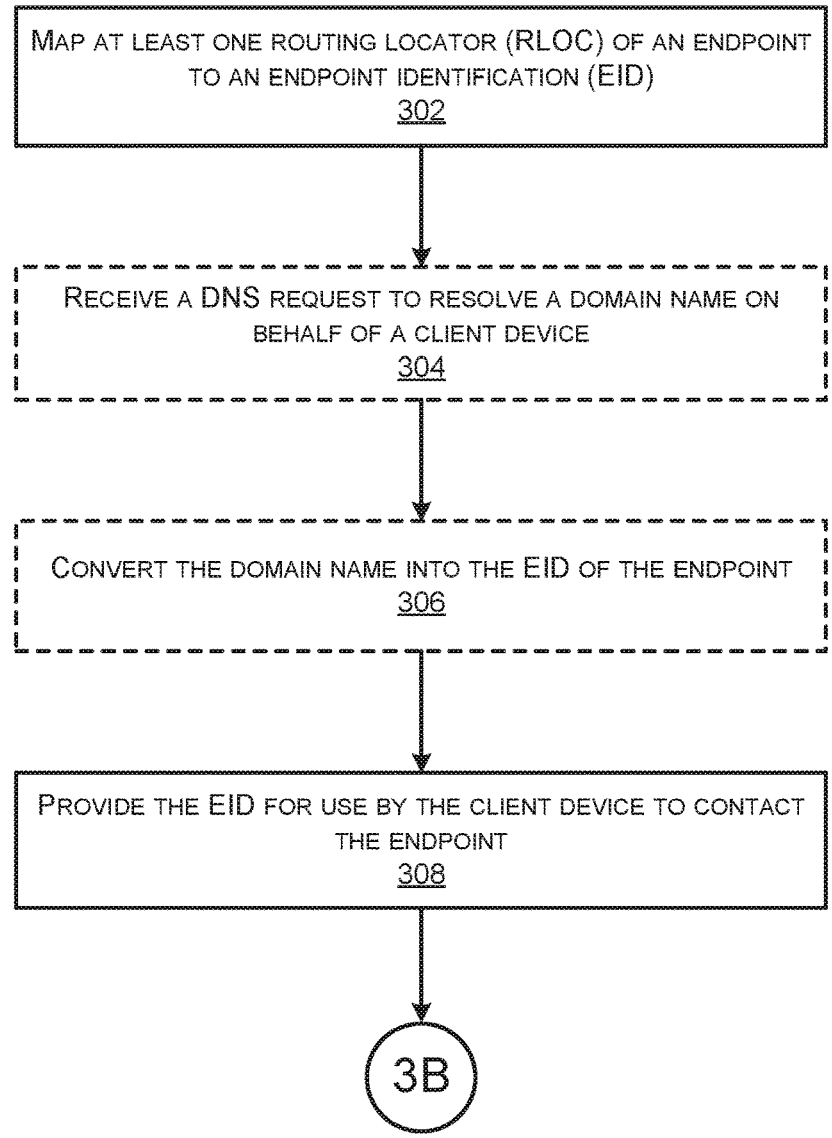
FIGS. 3A and 3B collectively illustrate a flow diagram of an example method for using LISP in conjunction with DNS to obfuscate server-side addresses in data communications.
Figure 3B:
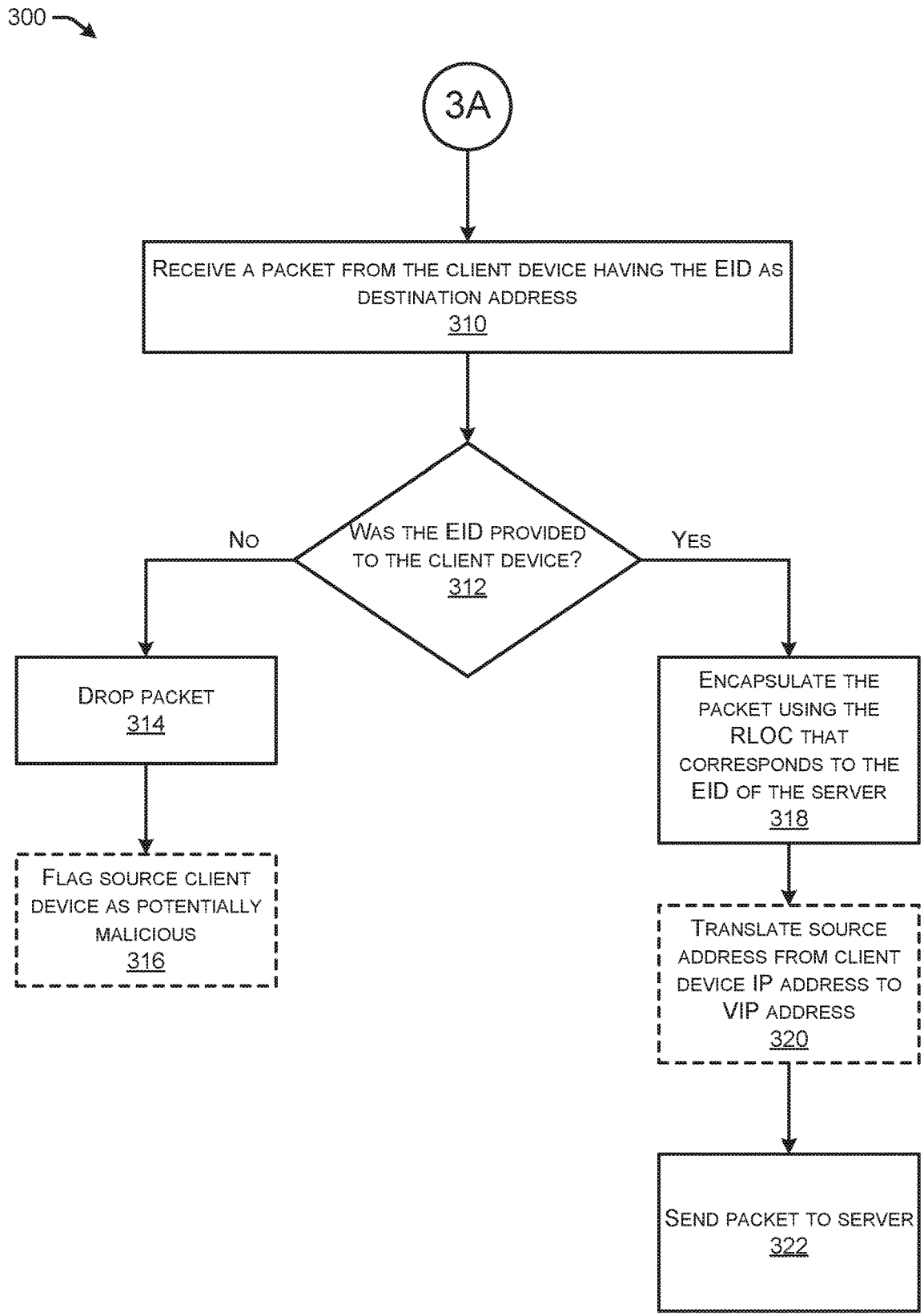

FIGS. 3A and 3B collectively illustrate a flow diagram of an example method 300 that illustrates aspects of the functions performed at least partly by the devices as described in FIGS. 1A, 1B, and 2. The logical operations described herein with respect to FIGS. 3A and 3B may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 3A and 3B and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more FIGS. 3A and 3B collectively illustrate a flow diagram of an example method 300 for using LISP in conjunction with DNS to obfuscate server-side addresses in data communications.

In some examples, the steps of method 300 may be performed, at least partly, by a virtual network service 102, which may include, be included in, or at least be associated with a DNS 106 (e.g., communicatively coupled). The virtual network service 102 may comprise one or more processors and one or more non-transitory computer-readable media storing computer-executable instructions that, when executed by the one or more processors, cause the one or more processors to perform the operations of method 300.

At 302, the virtual network service 102 may map at least one routing locator (RLOC) of an endpoint to an EID. For instance, the mapping component 116 may allocate a virtual network, which may include a group of EIDS, to one or more RLOCS of a server 110.

At 304, the virtual network service 102 may receiving a DNS request to resolve a domain name on behalf of a client device. For instance, the DNS 106 may receive a DNS request 112 that includes a domain name 114 for a website, service, etc., that the client device 104 is requesting be resolved.

At 306, the virtual network service 102 may convert the domain name into the EID of the endpoint. For instance, the DNS 106 may perform standard techniques for translating or converting the domain name 114 into a corresponding EID.

It should be noted that steps 304 and 306 may be performed by the virtual network service 102 that includes a DNS 106, or may be performed independent of the virtual network service 102 and by an independent DNS 106.

At 308, the virtual network service 102 may provide the EID for use by the client device to contact the endpoint. For instance, the virtual network service 102 may provide the EID 122 to the DNS 106, which in turn provides the EID 122 to the client device 104 in a DNS response 124.

At 310, the virtual network service 102 may receive a packet from the client device that has the EID as the destination address. For instance, the virtual network service 102 may receive a client packet 126 from the client device 104 that includes the EID 122 that maps to the RLOC 120 of the endpoint/server 110 that the client device 104 would like to communicate with.

At 312, the virtual network service 102 may determine whether the EID was provided to the client device. For instance, the mapping component 116 may check the mappings 118 to see if the EID 122 was provided to the client device 104 and is mapped to the client device ID.

In instances where the EID was not provided to the client device (e.g., rogue device), the virtual network service 102 may, at 314 drop the packet because the device is not permitted to use that EID. Further, the virtual network service 102 may also flag the source device as potentially malicious at 316 because the source device was using a EID that was not provided to it by the virtual network service 102, and it may have been improperly obtained by a malicious observer.

In instances where the EID was provided to the client device 104, the virtual network service 102 may encapsulate the packet using the RLOC that corresponds to the EID at 318. Further, the virtual network service 102 may, optionally, encapsulate the packet such that the outer header of the data packet has a source address indicating the VIP address 130 for return traffic from the server/endpoint 110 at 320. At 322, the virtual network service 102 may then send the client packet 126 to the endpoint device 110.

Figure 4:
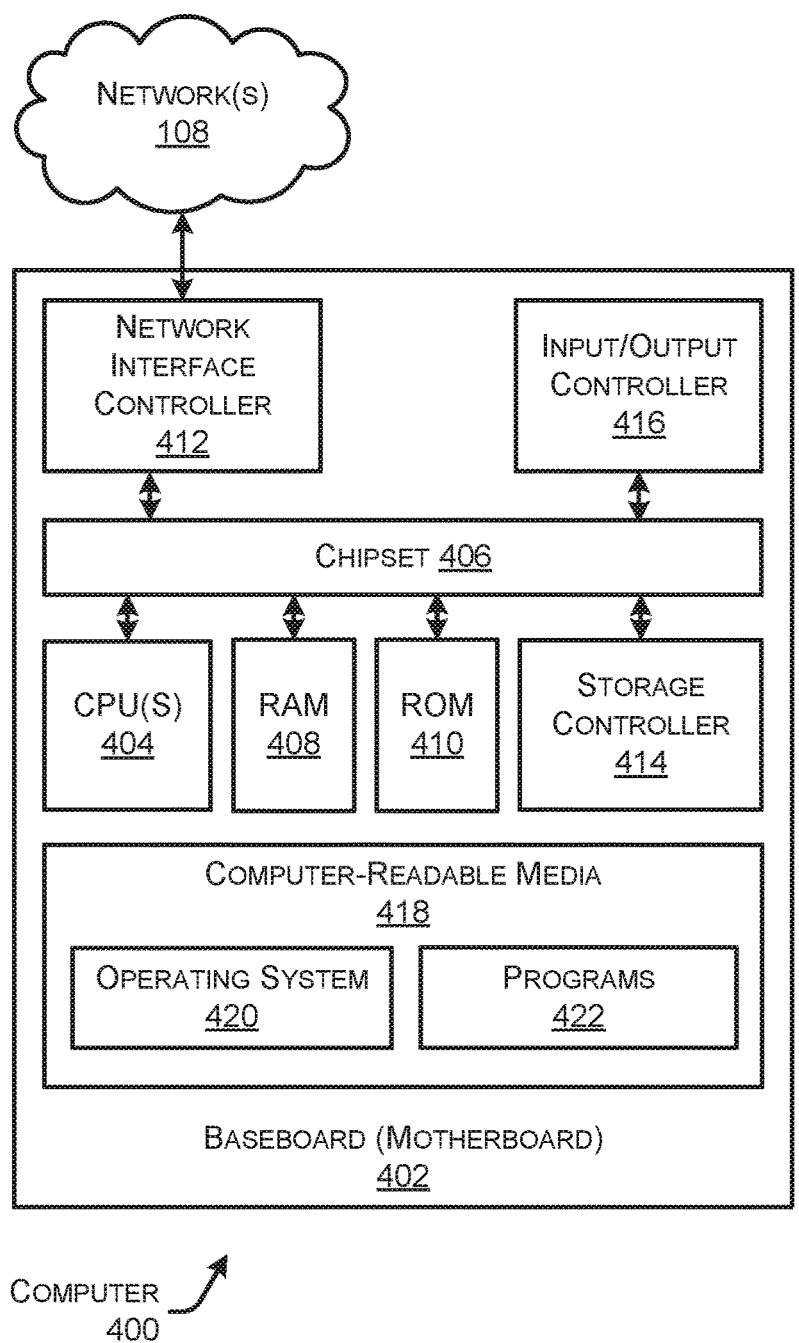
FIG. 4 is a computer architecture diagram showing an illustrative computer hardware architecture for implementing a computing device that can be utilized to implement aspects of the various technologies presented herein.

FIG. 4 shows an example computer architecture for a computer 400 capable of executing program components for implementing the functionality described above. The computer architecture shown in FIG. 4 illustrates a conventional server computer, workstation, desktop computer, laptop, tablet, network appliance, e-reader, smartphone, or other computing device, and can be utilized to execute any of the software components presented herein. The computer 400 may, in some examples, correspond to a device and/or a system of devices that support the virtual network service 102, the DNS 106, and/or a combination thereof, described herein, and may comprise networked devices such as servers, switches, routers, hubs, bridges, gateways, modems, repeaters, access points, etc. That is, the computer 400, or a system of computers 400, may be configured to perform some or all of the techniques performed by the virtual network service 102, some or all of the techniques performed by the DNS 106, and/or any combination thereof.

The computer 400 includes a baseboard 402, or "motherboard," which is a printed circuit board to which a multitude of components or devices can be connected by way of a system bus or other electrical communication paths. In one illustrative configuration, one or more central processing units ("CPUs") 404 operate in conjunction with a chipset 406. The CPUs 404 can be standard programmable processors that perform arithmetic and logical operations necessary for the operation of the computer 400.

The CPUs 404 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 406 provides an interface between the CPUs 404 and the remainder of the components and devices on the baseboard 402. The chipset 406 can provide an interface to a RAM 408, used as the main memory in the computer 400. The chipset 406 can further provide an interface to a computer-readable storage medium such as a read-only memory ("ROM") 410 or non-volatile RAM ("NVRAM") for storing basic routines that help to startup the computer 400 and to transfer information between the various components and devices. The ROM 410 or NVRAM can also store other software components necessary for the operation of the computer 400 in accordance with the configurations described herein.

The computer 400 can operate in a networked environment using logical connections to remote computing devices and computer systems through a network, such as the network 108. The chipset 406 can include functionality for providing network connectivity through a NIC 412, such as a gigabit Ethernet adapter. The NIC 412 is capable of connecting the computer 400 to other computing devices over the network 108. It should be appreciated that multiple NICs 412 can be present in the computer 400, connecting the computer to other types of networks and remote computer systems.

The computer 400 can be connected to a storage device 418 that provides non-volatile storage for the computer. The storage device 418 can store an operating system 420, programs 422, and data, which have been described in greater detail herein. The storage device 418 can be connected to the computer 400 through a storage controller 414 connected to the chipset 406. The storage device 418 can consist of one or more physical storage units. The storage controller 414 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 400 can store data on the storage device 418 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 418 is characterized as primary or secondary storage, and the like.

For example, the computer 400 can store information to the storage device 418 by issuing instructions through the storage controller 414 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 400 can further read information from the storage device 418 by detecting the physical states or characteristics of one or more particular locations within the physical storage units.

In addition to the mass storage device 418 described above, the computer 400 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 400. In some examples, the operations performed by devices in the virtual network service 102, and or any components included therein, may be supported by one or more devices similar to computer 400. Stated otherwise, some or all of the operations performed by the virtual network service 102, and or any components included therein, may be performed by one or more computer devices 400 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 418 can store an operating system 420 utilized to control the operation of the computer 400. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 418 can store other system or application programs and data utilized by the computer 400.

In one embodiment, the storage device 418 or other computer-readable storage media is encoded with computer-executable instructions which, when loaded into the computer 400, transform the computer from a general-purpose computing system into a special-purpose computer capable of implementing the embodiments described herein. These computer-executable instructions transform the computer 400 by specifying how the CPUs 404 transition between states, as described above. According to one embodiment, the computer 400 has access to computer-readable storage media storing computer-executable instructions which, when executed by the computer 400, perform the various processes described above with regard to FIGS. 1-3B. The computer 400 can also include computer-readable storage media having instructions stored thereupon for performing any of the other computer-implemented operations described herein.

The computer 400 can also include one or more input/output controllers 416 for receiving and processing input from a number of input devices, such as a keyboard, a mouse, a touchpad, a touch screen, an electronic stylus, or other type of input device. Similarly, an input/output controller 416 can provide output to a display, such as a computer monitor, a flat-panel display, a digital projector, a printer, or other type of output device. It will be appreciated that the computer 400 might not include all of the components shown in FIG. 4, can include other components that are not explicitly shown in FIG. 4, or might utilize an architecture completely different than that shown in FIG. 4.

The computer 400 may include one or more hardware processors 404 (processors) configured to execute one or more stored instructions. The processor(s) 404 may comprise one or more cores. Further, the computer 400 may include one or more network interfaces configured to provide communications between the computer 400 and other devices, such as the communications described herein as being performed by the virtual network service 102. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 422 may comprise any type of programs or processes to perform the techniques described in this disclosure for providing a virtual network service 102 that is capable of anonymizing service-side addresses. That is, the computer 400 may comprise any one of the devices that support the virtual network service 102. The programs 422 may comprise any type of program that cause the computer 400 to perform techniques for communicating with other devices using any type of protocol or standard, and utilizing LISP and/or DNS, to obfuscate server-side addresses.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system associated with a Domain Name System (DNS) service that obfuscates Internet Protocol (IP) addresses of endpoints using groups of endpoint identifications (EIDs), the system comprising:
one or more processors; and
one or more non-transitory computer-readable media storing computer-executable instructions that, when executed by the one or more processors, cause the one or more processors to perform operations comprising:
mapping at least one routing locator (RLOC) of an endpoint to an EID;
receiving a DNS request to resolve a domain name on behalf of a client device;
converting the domain name into the EID of the endpoint; and
providing the EID for use by the client device to contact the endpoint.

2. The system of claim 1, the operations further comprising:
mapping the EID to a first client identifier (ID) associated with the client device;
receiving another DNS request to resolve the domain name for another client device;
selecting the EID to provide to the other client device;
providing the EID for use by the other client device to contact the endpoint; and
mapping the EID to a second client ID associated with the other client device.

3. The system of claim 1, the operations further comprising:
determining that the EID maps to multiple RLOCs associated with the endpoint;
determining a selected RLOC of the multiple RLOCs to be used for encapsulation based at least in part on load balancing between the multiple RLOCs;
performing an encapsulation of a packet with the selected RLOC that corresponds to the EID; and
sending the packet to a next hop associated with the selected RLOC associated with the endpoint.

4. The system of claim 1, the operations further comprising:
creating a tunnel between a virtual service of the system and the endpoint such that:
first packets sent from the virtual service and to the endpoint have a home address of the virtual service as a source address; and
second packets sent from the endpoint to the virtual service have a destination address of the home address.

5. The system of claim 1, the operations further comprising:
receiving a packet having a destination address that is the EID;
determining that a source address of the packet is a source IP address of the client device that sent the packet;
performing an encapsulation of the packet with an RLOC that corresponds to the EID; and
sending the packet to a next hop associated with the RLOC of the endpoint.

6. The system of claim 5, wherein the packet is associated with a mobile IP version 4 (MIPv4) protocol and the encapsulation includes converting the packet to an MIPv6 protocol.

7. The system of claim 5, the operations further comprising, prior to sending the packet:
changing the source address of the packet from the source IP address to a particular system VIP address associated with the system; and
mapping the particular system VIP address to the source IP address of the client device.

8. The system of claim 7, the operations further comprising:
receiving a return packet from the endpoint;
determining that a destination address of the return packet is the particular system VIP address;

based at least in part on the mapping of the particular system VIP address to the source IP address, changing the destination address of the return packet from the particular system IP address to the source IP address; and sending the return packet to the client device.

9. The system of claim 1, the operations further comprising:
receiving a packet from a source device;
determining that a destination address of the packet is the EID;
determining that the source device is not the client device to which the EID was provided; and
dropping the packet.

10. The system of claim 1, the operations further comprising:
receiving a packet from a source device;
determining that a destination address of the packet is the EID;
determining that the source device is the client device to which the EID was provided; and
forwarding the packet to a next hop associated with the endpoint.

11. A method performed at least partly by a computing system associated with a Domain Name System (DNS) service that obfuscates Internet Protocol (IP) addresses of endpoints using groups of endpoint identifications (EIDs), the method comprising:
mapping at least one RLOC of an endpoint to an EID;
receiving a DNS request to resolve a domain name on behalf of a client device;
converting the domain name into the EID of the endpoint; and
providing the EID for use by the client device to contact the endpoint.

12. The method of claim 11, further comprising:
mapping the EID to a first client identifier (ID) associated with the client device;
receiving another DNS request to resolve the domain name for another client device;
selecting the EID to provide to the other client device;
providing the EID for use by the other client device to contact the endpoint; and
mapping the EID to a second client ID associated with the other client device.

13. The method of claim 11, further comprising:
receiving a packet having a destination address that is the EID;
determining that a source address of the packet is a source IP address of the client device that sent the packet;
performing an encapsulation of the packet with an RLOC that corresponds to the EID; and
sending the packet to a next hop associated with the RLOC of the endpoint.

14. The method of claim 13, further comprising, prior to sending the packet:
changing the source address of the packet from the source IP address to a particular system VIP address associated with the computing system; and
mapping the particular system VIP address to the source IP address of the client device.

15. The method of claim 14, further comprising:
receiving a return packet from the endpoint;
determining that a destination address of the return packet is the particular system VIP address;
based at least in part on the mapping of the particular system VIP address to the source IP address, changing the destination address of the return packet from the particular system IP address to the source IP address; and
sending the return packet to the client device.

16. The method of claim 11, further comprising:
receiving a packet from a source device;
determining that a destination address of the packet is the EID;
determining that the source device is not the client device to which the EID was provided; and
dropping the packet.

17. The method of claim 11, further comprising:
receiving a packet from a source device;
determining that a destination address of the packet is the EID;
determining that the source device is the client device to which the EID was provided; and
forwarding the packet to a next hop associated with the endpoint.

18. One or more non-transitory computer-readable media storing computer executable instructions that, when executed by one or more processors, cause the one or more processors to perform operations comprising:
mapping at least one RLOC of an endpoint from multiple endpoints to an EID from multiple EIDs;
determining that a client device requested an IP address of the endpoint;
selecting the EID from the multiple EIDs to provide to the client device;
storing a first association between a client identifier (ID) of the client device and the EID;
providing the EID for use by the client device to contact the endpoint;
receiving a first packet having a destination address that is the EID; and
in response to determining that the first packet was sent from the client device, sending the first packet to the endpoint, otherwise dropping the first packet.

19. The one or more non-transitory computer-readable media of claim 18, the operations further comprising:
changing a source address of the packet from a source IP address to a particular system VIP address associated with the system; and
mapping the particular system VIP address to the source IP address of the client device.

20. The one or more non-transitory computer-readable media of claim 19, the operations further comprising:
receiving a second packet sent from the endpoint;
determining that a destination address of the second packet is the particular VIP address;
based at least in part on the mapping of the particular VIP address to the source IP address, changing the destination address of the second packet from the particular VIP address to the source IP address; and
sending the second packet to the client device.

* * * * *